Feb. 3, 1970     P. HAAKE     3,493,037
THERMOSTATIC APPARATUS
Filed Feb. 1, 1968
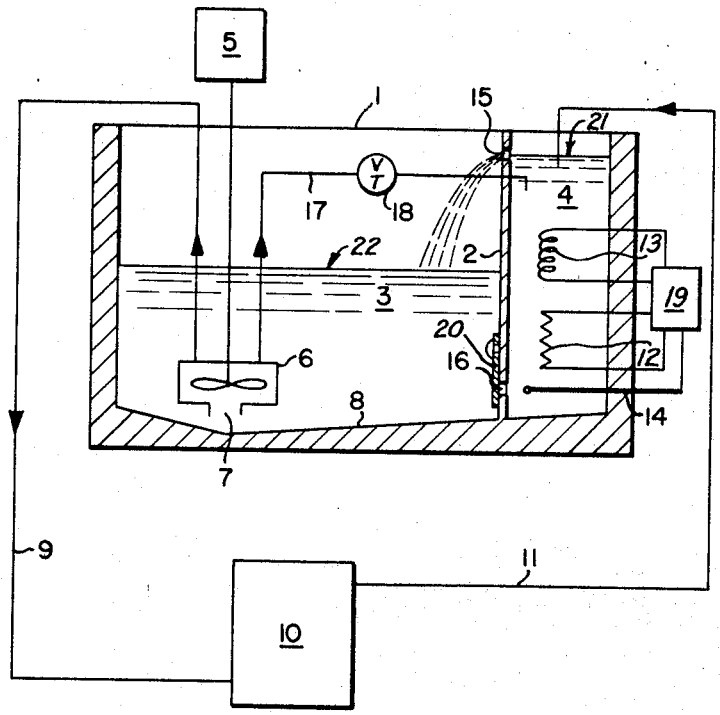
INVENTOR
PETER HAAKE
BY *B. Eshlinger*
ATTORNEY

United States Patent Office 3,493,037
Patented Feb. 3, 1970

3,493,037
THERMOSTATIC APPARATUS
Peter Haake, Stettiner Strasse 6,
Karlsruhe-Waldstadt, Germany
Filed Feb. 1, 1968, Ser. No. 702,435
Claims priority, application Germany, Feb. 17, 1967,
H 61,874
Int. Cl. B60h 1/00; F28d 15/00; F25d 17/02
U.S. Cl. 165—40       8 Claims

ABSTRACT OF THE DISCLOSURE

This apparatus comprises a liquid container partitioned to have two sections, one larger than the other. A pump draws liquid from the bottom of the larger section and circulates the liquid from the larger section to the object, whose temperature is to be controlled, in heat-exchanging relation thereto, and then back to the smaller section at the top thereof. Heating and cooling coils and a temperature senser extend into the smaller section to regulate the temperature of the liquid in the system. A hole near the bottom of the partition permits only as much liquid to flow from the smaller section to the larger section as can be pumped through the system in a unit of time. A duct connects the pump with the top of the smaller section to insure supply of liquid to the smaller section if liquid flows out of this section into the larger section faster than it is returned from the system to the smaller section.

---

The present invention relates to thermostatic apparatus including a reservoir for the reception of the liquid, which serves as the heat conveyor, and in which the members necessary for temperature regulation and a circulating pump are arranged.

Thermostatic apparatus of this general type are known in the prior art and serve for stabilization of the temperature of different kinds of articles. For this purpose, the liquid of the bath regulated in the thermostatic apparatus to a selected temperature is brought with the help of the circulating pump into heat exchange relationed with the articles to be temperature controlled. If the bath liquid and the articles are not thermically balance, there takes place an exchange of heat between the two. The heat exchange between the bath liquid and the article causes a temperature variation to occur in the bath fluid. This temperature variation should be held by the thermostat as small as possible. The size of the temperature variation depends upon the heat capacity of the bath liquid present in the thermostat. Since the heat capacity of the bath liquid, however, is a direct function of the volume of the bath liquid, there was employed in high precision thermostats the greatest possible bath volume heretofore.

Besides accuracy of temperature, with a thermostat the temperature range, within which the thermostat can be adjusted, is also of decisive meaning. With thermostats for large temperature ranges, the heat expansion of the bath liquid must be considered. The heat expansion especially cannot be neglected if the volume of the liquid in the circulating system is comparable with the volume of the thermostatic reservoir. With previous thermostats, because of heat expansion, there could, therefore, occur considerable variations of the level of the bath whereby the danger of overflow as well as the danger of the heating body and of other installations going dry existed.

With thermostats having large temperature range, moreover, special heat carriers are necessary, which as a rule are very costly so that such prior thermostats are no longer practical. It is, therefore, desirable that thermostats with a large temperature range should on this account provide high accuracy with a relatively small bath volume.

It is the primary object of the present invention to provide a thermostat which can maintain a high governing accuracy with a greatly varying bath volume.

This problem is solved according to the invention with a thermostat of known kind, by dividing the reservoir into two cells having essentially different volumes, where the members necessary for regulation of temperature are arranged in the smaller cell, while in the larger cell the circulating pump is housed. The circulating pump return line leads into the smaller section and the two sections are connected with one another so that the level of the liquid in the smaller section normally is essentially constant and independent of the level of the liquid in the larger section.

With thermostats built according to the invention, thus going dry of the heater cannot occur since this is disposed in the smaller section which is continuously filled with liquid.

Preferably, the two sections are connected through an opening disposed in the neighborhood of the reservoir base, whose cross section is so defined that the smaller section remains filled with liquid as long as the level in the large section is not below a height fixed by the suction opening of the pump. The liquid pumped by the pump to the article flows back into the smaller section. It is there, as occasion calls for, heated or cooled and then flows again into the larger section and can then again be pumped to the article.

Parallel to the circulating duct leading from the pump to the article and back to the smaller section, there is preferably provided another lead which extends from the pump directly to the smaller section, whereby during operation of the pump, the smaller section remains filled completely with liquid until the level falls down below the suction opening of the pump. The cross section of the opening between the two sections is preferably adjustable.

The drawing shows schematically an embodiment of the invention.

The thermostat container or reservoir 1 is for example divided by a partition wall 2 into two sections 3 and 4, of which the one part 3 has an essentially larger volume than the other part 4. There is in the larger section 3 a rotary pump 6 driven by a motor 5 whose suction opening 7 is disposed in the neighborhood of the bottom 8 of the reservoir which bottom preferably has a V-shaped cross-section. The suction opening 7 of the rotary pump is thereby disposed over the deepest part of the bottom 8. With the help of the rotary pump 6, the liquid in the reservoir 1 is pumped through the lead 9 to the article 10 to be heated and through the return lead 11 back to the smaller section 4. In the smaller section 4 there are disposed the devices serving for regulation of the temperature of the liquid, namely, a heating apparatus 12, a cooling device 13, and a temperature senser 14. Through conventional electrical means diagrammatically indicated by the box 19 the senser can regulate the operation of the heating and cooling coils. The smaller section 4 is connected with the larger section 3 through a over-run aperture 15. As long as the level of the liquid in the larger section 3 lies above the suction opening on take 7 the liquid is pumped through the lead 9 to the article to be heated and then through the return duct 11 into the smaller section 4. The temperature of the liquid contained in the smaller section 4 is regulated to a selected temperature degree and the liquid flows back by the overflow opening 15 again into the larger section 3.

Preferably there is provided in the partition wall 2 in the neighborhood of the reservoir bottom 8 an opening 16 which is of such size in cross section that through this opening 16 for a unit of time only so much liquid can flow from the smaller section 4 to the larger section 3 as is pumped by the circulating pump 6 from the larger section 3 into the smaller section 4. Between the pump 6 and the smaller section 4, moreover, there can be provided a duct 17 running in shunt to the ducts 9, 11. This is especially of advantage if in a unit of time there flows a smaller quantity of liquid into the smaller section 4 through the ducts 9, 11 than in the same time liquid flows out through the opening 16 in the larger section 3. Preferably, there is provided in the duct 17 a throttle valve 18 with the help of which the flow through the duct 17 can be adjusted. If occasion arises the through flow section of the opening 16 can also be made adjustable.

The provision of the opening 16 mentioned has the advantage that the liquid flows through the smaller vessel 4 from above to below and thereby flows past the heating device 13 and the cooling device 12 as well as the temperature senser 14 whereby an accurate stabilization of temperature is guaranteed. The temperature senser 14 is preferably arranged in the reach of the opening 16. During operation of the circulating pump there is thus continuously insured that the smaller section 4 is filled continuously with liquid independently of the bath level in the larger section 3 as long as the level of the liquid in the larger section 3 lies above the suction opening 7 of the rotary pump.

The operation is as follows: During the operation of the motor 5, the pump 6 sucks liquid through its intake 7 and feeds the liquid through the duct 9 in heat exchange relationship with the article 10 to the duct 11 from which the liquid is discharged into the upper portion of the smaller section 4 of the container 1. As the selected degree of the temperature of the circulating liquid may be changed within a large temperature range, heat expansion and contraction of the liquid in the duct 9, 11 and in the heat exchanger coordinated to the article 10 may cause considerable variation of the level 22 of the liquid in the container section 3.

Suitable flow-control means are coordinated to the sections 3 and 4 of the container for maintaining a constant liquid level 21 in the smaller section 4. In the embodiment shown such flow-control means comprise an overflow port 15 provided in the partition 2 near the top thereof and a port 16 in the partition near the bottom thereof. The cross-section of the port 16 may be adjustable, for instance by a swingable valve plate 20 pivotally mounted on the partition 2 for manual adjustment. The cross-section of port 16 must be so adjusted that it permits less liquid to pass into the larger section 3 than is supplied through duct 11 thus causing the surplus of liquid to overflow through port 15 into the larger compartment 3. The variable level 22 of the liquid depends on the selected degree of the temperature of the liquid. A very low degree causes contraction of the liquid contained in the circuit thus lowering the level 22, whereas a high degree causes expansion of the liquid thus raising the level 22. At any rate, however, the level 22 is lower than the level 21. It is an obvious requirement, of course, that the level 22 must never drop below the intake 7 of the pump 6.

The temperature-controlling means, such as the temperature sensor 14, the heating apparatus 12 and the cooling device 13, disposed in the smaller section 4 of the container will maintain the selected temperature of the liquid continuously circulating through the system comprising container section 3, duct 9, article 10, duct 11 and container section 4. As the level 21 is kept constant, a full immersion of the elements 12, 13 and 14 in the liquid is insured even in event of a considerable contraction of the liquid circulating in the system. In this manner, the object is achieved of maintaining a high temperature-governing accuracy even with a greatly varying volume of the liquid.

In the claims:

1. Thermostatic apparatus in a system for controlling the temperature of an article by pump-actuated circulation of a liquid in heat-exchange relationship with said article and through said apparatus comprising
    a container for the liquid divided by a partition into two sections of different volume, respectively,
    temperature control members disposed in the smaller section for maintaining the temperature of the liquid therein on a selected degree,
    a pump mounted in the larger section for circulating liquid from the larger section of the container into heat-transfer relation to said article, and thence to said smaller section of the container, and
    means for maintaining a constant liquid level in said smaller section, said means including a port connecting the two sections so that the liquid level in the smaller section is constant and independent of the liquid level in the larger section.

2. Thermostatic apparatus according to claim 1, wherein
    the suction opening for the pump is near the bottom of the container and is spaced from the partition, and
    said port is located in the partition near the bottom of the container.

3. Thermostatic apparatus according to claim 2, wherein an auxiliary duct connects an outlet of the pump directly to the smaller section adjacent the top of said smaller section.

4. Thermostatic apparatus according to claim 3 wherein an adjustable throttle valve is provided in said auxiliary duct to control flow through said auxiliary duct from the pump to said smaller section.

5. Thermostatic apparatus according to claim 2 wherein the flow section of said port is adjustable.

6. Thermostatic apparatus according to claim 4, wherein the size of said port is such that only so much liquid will flow from the smaller section into the larger section as is pumped through the system from the larger section into the smaller section.

7. A system for controlling the temperature of an article by pump-actuated circulation of a liquid in heat-exchange relationship with said article and through a thermostat apparatus, comprising a container for the liquid, a partition in said container dividing same into a larger section and a smaller section, temperature-controlling means in said smaller section for maintaining the temperature of the liquid therein on a selected degree, a pump constituting the circulating pump of the system disposed within said larger section, the intake of said pump opening permanently into said larger section, a duct constituting the liquid circuit of said system and communicating with the outlet of said pump to be fed thereby with the circulating liquid, said duct leading from said outlet of said container to said article and from said article back to said container and into said smaller section, whereby heat expansion and contraction of the liquid in said duct due to a change of said selected degree will cause variation of the level of liquid in said larger container section, and flow-control means coordinated to said sections for maintaining a constant liquid level in said smaller section irrespective of the variable level in said larger section, said flow-control means including at least one communication between said sections.

8. A system as claimed in claim 7 in which said flow-control means is formed by an overflow port constituting said communication between said sections, said port being located above the range of the variable liquid level in said larger section.

References Cited

UNITED STATES PATENTS

| | | | |
|---|---|---|---|
| 2,023,069 | 12/1935 | Fugle | 62—435 X |
| 2,179,898 | 11/1939 | Pfeiffer | 62—435 X |
| 2,495,878 | 1/1950 | Tull | 62—393 X |
| 3,301,318 | 1/1967 | Haake | 62—435 X |

EDWARD J. MICHAEL, Primary Examiner

U.S. Cl. X.R.

62—435; 165—107